(12) United States Patent
Yasutomi et al.

(10) Patent No.: US 10,946,431 B2
(45) Date of Patent: Mar. 16, 2021

(54) METHOD FOR SHEAR PROCESSING (71) Applicant: NIPPON STEEL & SUMITOMO METAL CORPORATION, Tokyo (JP)

(72) Inventors: Takashi Yasutomi, Tokyo (JP); Masahiro Saito, Tokyo (JP); Shigeru Yonemura, Tokyo (JP); Tohru Yoshida, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 153 days.

(21) Appl. No.: 16/329,901

(22) PCT Filed: Sep. 1, 2017

(86) PCT No.: PCT/JP2017/031681
§ 371 (c)(1),
(2) Date: Mar. 1, 2019

(87) PCT Pub. No.: WO2018/043730
PCT Pub. Date: Mar. 8, 2018

(65) Prior Publication Data
US 2019/0240715 A1    Aug. 8, 2019

(30) Foreign Application Priority Data

Sep. 2, 2016 (JP) .............................. JP2016-171743

(51) Int. Cl.
*B21D 28/34* (2006.01)
*B23D 15/06* (2006.01)
(Continued)

(52) U.S. Cl.
CPC ............. *B21D 28/34* (2013.01); *B21D 28/00* (2013.01); *B23D 15/04* (2013.01); *B23D 15/06* (2013.01)

(58) Field of Classification Search
CPC ........ B21D 28/34; B21D 28/24; B23D 15/06; B26F 1/14; Y10T 83/9428;
(Continued)

(56) References Cited

U.S. PATENT DOCUMENTS 904,714 A * 11/1908 McGrath ................ B21D 28/34
83/686

FOREIGN PATENT DOCUMENTS

DE       10051110 A1 *  4/2002    ................ B26F 1/14
DE       10144136 A1 *  4/2003    ................ B26F 1/02
(Continued)

OTHER PUBLICATIONS

English Translation of DE10051110. (Year: 2002).*
(Continued)

*Primary Examiner* — Jennifer B Swinney
(74) *Attorney, Agent, or Firm* — Birch, Stewart, Kolasch & Birch, LLP (57) ABSTRACT

The present invention provides a method for shear processing whereby a sheared surface having a small residual stress and excellent surface properties is formed and the service life of a punch is prolonged in a shear processing for shearing, by a shear line that crosses a weld zone, a workpiece with a large thickness of level difference of a weld zone and/or obtained by welding together a steel sheet having a strength of 1000 MPa or more and another steel sheet. The shearing for shear processing method according to the present invention is a method for shearing a workpiece having a weld zone using a punch and a die, the method characterized in that two protrusions are provided to a cutting edge of the punch, all or part of the weld zone of the workpiece is flanked from the two sides by the two protrusions, and the workpiece is sheared by a shear line that crosses the weld zone.

13 Claims, 9 Drawing Sheets

(51) Int. Cl.
*B21D 28/00* (2006.01)
*B23D 15/04* (2006.01)

(58) Field of Classification Search
CPC ............. Y10T 83/9447; Y10T 83/9423; Y10T 83/7587; Y10T 83/7573; B23Q 3/06
See application file for complete search history.

(56) References Cited

FOREIGN PATENT DOCUMENTS

| DE | 102012013771 A1 | * | 1/2014 | ............. B21D 28/34 |
|---|---|---|---|---|
| JP | 58-18627 U | | 2/1983 | |
| JP | 62-77126 A | | 2/1983 | |
| JP | 61172629 A | * | 8/1986 | ............. B21D 28/34 |
| JP | 4-60318 U | | 5/1992 | |
| JP | 2006-224151 a | | 8/2006 | |
| JP | 2007-283339 a | | 11/2007 | |
| JP | 2009-183989 A | | 8/2009 | |
| JP | 2010-36195 A | | 2/2010 | |
| JP | 2014-111283 A | | 6/2014 | |
| KR | 10-2014-0053691 A | | 5/2014 | |

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2017/031681, dated Mar. 14, 2019, with English translation.
International Search Report (Form PCT/ISA/210) for International Application No. PCT/JP2017/031681, dated Nov. 7, 2017, with English translation.
Unknown, "The Proceedings of the 63rd Japanese Joint Conference for the Technology of Plasticity", Oct. 8, 2012, pp. 209-210, (4 pages total).
Extended European Search Report, dated Mar. 13, 2020, for corresponding European Application No. 17846733.8, along with an English translation.
Gurney, "Fatigue of wielded structures" Preface to the First Edition, Cambridge University Press, London, Dec. 31, 1979, XP002797978, (Total p. 1, p. xi).

* cited by examiner

METHOD FOR SHEAR PROCESSING

FIELD

The present invention relates to a method for shearing metal sheet used in automobiles, household electrical appliances, building structures, ships, bridges, construction machinery, various plants, etc. and comprising iron, copper, zinc, tin, aluminum, titanium, magnesium, or alloys based on the same, in particular a method for shear processing able to raise the fatigue characteristics and hydrogen embrittlement resistance at the sheared surface of metal sheets joined by welding.

BACKGROUND

Stamping or punching or otherwise shearing a metal sheet by a press is high in production efficiency and is inexpensive in processing cost, so is being widely used for processing in electronic equipment, auto parts, etc. However, there are the problems that if shearing over 1000 MPa high strength steel sheet, at the stamped end face (sheared surface), the tensile residual stress (below, unless particularly otherwise stated, the tensile residual stress simply described as "residual stress") becomes high, hydrogen embrittlement cracks (also referred to as season cracks, delayed fracture) easily form, and the fatigue resistance falls.

Further, when shearing a tailor welded blank (TWB) joining the same type or different types of steel sheets by welding or another workpiece, it is known that the hydrogen embrittlement resistance and fatigue resistance further fall at the sheared surface of the weld zone comprising the weld metal and heat affected zone (below, simply referred to as the "weld zone").

Note that the "metal sheet" referred to in this Description indicates a cold rolled sheet or metal sheet of a thickness of 3.0 mm or less comprising iron, copper, zinc, tin, aluminum, titanium, magnesium, or an alloy based on the same which is sheared by stamping or punching by pressing, then expanded at the hole at the sheared part or formed with a flange.

The stamped end face of the workpiece after a stamping process is composed of an undercut formed by the workpiece being pushed in by the punch, a sheared surface formed by the workpiece being pulled inside the space between the punch and die (below, sometimes simply referred to as the "clearance") and being locally drawn, a fractured surface formed by the workpiece being broken in the middle of formation of the sheared surface, and burrs formed at the back surface of the stamped workpiece.

Normally, the clearance and tool shape are adjusted with the aim of keeping the amount of formation of the above-mentioned undercut, sheared surface, fractured surface, and burrs at the stamped end face within the required ranges and improving the stretch flangeability, fatigue resistance, hydrogen embrittlement resistance, and other characteristics of the end face after being worked.

For example, PTL 1 discloses using a tool having a punch and/or die with a blade part at the front end part of which a bending blade having a shape of a projecting part is provided and having a predetermined radius of curvature and blade shoulder angle to render the clearance 25% or less of the thickness of the workpiece and reduce the work hardening and tensile residual stress at the end face after working.

Further, NPL 1 reports making the clearance a thickness ratio with the thickness of the workpiece of 1% or less to perform the shear processing under a high compressive stress and reduce the tensile residual stress at the stamped surface. Further, PTL 2 discloses the technique of setting a direction excellent in ductility and a cutting edge direction of a punch of a wedge shape to 10° or less to perform punching excellent in burr resistance.

Further, PTL 3 discloses a press forming machine provided with a top die for forming different types of parts and a bottom die for forming different types of parts and simultaneously forming different types of parts. The top die has a plurality of top die parts for respectively forming parts, blank holders provided at the center parts of the top die parts, and convex cutting parts formed protruding downward at the bottom surfaces of the top blank holders.

Further, PTL 4 discloses a trimming device comprising a bottom blade supporting a press formed workpiece and a top blade advancing toward the bottom blade to shear part of the workpiece. The trimming device is integrally provided with a protruding blade which protrudes out in the direction of advance of the top blade at part of the top blade and proceeds in advance at the time of descent of the top blade to cut into the workpiece.

If it were possible to control the shear processing to reduce the residual stress at the sheared end face, it would be possible to improve the hydrogen embrittlement resistance or fatigue resistance (for example, see PTL 1 and NPL 1). However, there is a problem with the sheared surface formed by the method disclosed in PTL 1. That is, if making the punch shape uniform in the direction of the cutting ridgeline, in the sheared surface, there is the problem that cracks easily occur at the weld zone where the ductility and toughness are low.

If controlling the shearing conditions so as to reduce the residual stress of the weld zone on a priority basis, it would be possible to further raise the fatigue resistance or hydrogen embrittlement resistance at the sheared surface of the workpiece. However, if making the clearance between the punch and die a thickness ratio with the thickness of the workpiece of 1% or less as taught in NPL 1, there is the risk of even a slight offset of the punch causing the punch to abut against the die and causing the punch and/or die to break.

Further, if the clearance between the punch and die has a thickness ratio with the thickness of the workpiece of 1% or less, there is the problem that causes the side surface of the punch and/or die to be worn resulting in the clearance changing and thereby prevents the effect of improvement of the fatigue resistance or hydrogen embrittlement resistance at the sheared surface of the workpiece from being sufficiently obtained.

Further, none of the punching method disclosed in PTL 2, the press forming method disclosed in PTL 3, and the trimming device disclosed in PTL 4 discloses a shear processing which shears by a shear line crossing a weld zone. That is, none of PTLs 1 to 3 disclose conditions for reducing the residual stress of the sheared surface of the weld zone.

CITATION LIST

Patent Literature

[PTL 1] Japanese Unexamined Patent Publication No. 2006-224151
[PTL 2] Japanese Unexamined Patent Publication No. 2014-111283
[PTL 3] Japanese Unexamined Patent Publication No. 2009-183989

[PTL 4] Japanese Unexamined Utility Model Publication No. 4-060318

Non Patent Literature

[NPL 1] Proceedings of the 63rd Japanese Joint Conference for the Technology of Plasticity, p. 338

SUMMARY

Technical Problem

Therefore, in consideration of the problems in the prior art, the technical problem to be solved by the present invention is to form a sheared surface with a small residual stress and to prolong the service life of a punch in a shear processing which shears, by a shear line crossing the weld zone, a workpiece with a large thickness of step difference of a weld zone and/or obtained by welding together a steel sheet of a strength of 1000 MPa or more and another steel sheet (including steel sheet with a strength of 1000 MPa or more). In addition, the object to be achieved by the present invention is to provide a method for shear processing solving the above-mentioned technical problem. By reducing the residual stress, the surface properties of the fractured surface are improved and as a result the hydrogen embrittlement resistance is improved.

Solution to Problem

The inventors intensively studied techniques for solving the above technical problem. As a result, they found that by virtue of providing the cutting edge of a punch with protrusions, for example, wedge shaped protrusions, at a required distance and shearing a workpiece so that all or part of the weld zone is positioned between the two protrusions, even if the thickness of the level difference of the weld zone is large, it is (x) possible to form a sheared surface small in residual stress and excellent in surface properties and (y) possible to suppress the advance of wear of the protrusions of the cutting edge to extend the service life of the punch.

Further, the inventors found that even in the case where the workpiece is a workpiece obtained by welding together a steel sheet with a strength of 1000 MPa or more and another steel sheet (including steel sheet with a strength of 1000 MPa or more), it is (x) possible to form a sheared surface small in residual stress and excellent in surface properties and (y) possible to suppress the advance of wear of protrusions of the cutting edge to extend the service life of the punch.

The present invention was made based on the above findings and has as its gist the following:

(1) A method for shear processing to shear a workpiece so as to cross a weld zone of the workpiece by using a shear processing device comprising at least a die, a stopper and a punch, the workpiece being obtained by welding together two metal sheets, wherein the punch has two protrusions at a cutting edge of the punch, and all or a part of the weld zone of the workpiece are positioned between the two protrusions of the punch.

(2) The method according to (1), wherein, in a cross-section of the two protrusions, the cross-section formed by a ridgeline of a blade of the punch and a movement direction of the punch, facing sides of the two protrusions are gradually away in a direction extending from a base end part of the punch toward the front ends of the protrusions.

(3) The method according to (1) or (2), wherein, in a cross-section of the two protrusions, the cross-section formed by a ridgeline of a blade of the punch and a movement direction of the punch, shapes of the front ends of the two protrusions are a flat shape, an arc shape, or a slanted surface shape.

(4) The method according to (1) or (2), wherein, in a cross-section of the two protrusions, the cross-section formed by a ridgeline of a blade of the punch and a movement direction of the punch, shapes of the front ends of the two protrusions are different from each other, and the both shapes are a flat shape, an arc shape or a slanted surface shape.

(5) The method according to any one of (1) to (4), wherein each of the two protrusions has the same height in a direction parallel to the weld zone of the workpiece.

(6) The method according to any one of (1) to (4), wherein each of the two protrusions has a height gradually decreasing heights in a direction parallel to the weld zone of the workpiece.

(7) The method according to any one of (1) to (6), wherein a distance D, in terms of mm, between the front ends of the two protrusions is from 0.8×d or more and 3.0×d or less, wherein d, in terms of mm, represents a width of the weld zone.

(8) The method according to any one of (1) to (7), wherein, in a cross-section formed by a ridgeline of a blade of the punch and a movement direction of the punch, an area S and an area S' satisfy the following formula (1):

$$0 < S \leq 6 \cdot S' \tag{1}$$

wherein the area S is an area surrounded by facing sides in the two protrusions, the ridgeline, and a line connecting the front ends of the two protrusions, and wherein an area S' is an ½ area of a total of the respective areas surrounded by, in each of the protrusions, a side facing the other protrusion, the ridgeline, and a vertical line drawn from the front end of the protrusion down to the ridgeline.

(9) The method according to (8), wherein shapes of the two protrusions are symmetric with respect to an axis parallel to the movement direction of the punch, wherein an area S surrounded by the facing sides in the two protrusions, the ridgeline, and the line connecting the front ends of the two protrusions is specified by the following formula (2), wherein an area S' surrounded by, in each of the protrusions, the sides facing the other protrusion, the ridgeline, and the vertical line drawn from the front end of the protrusion down to the ridgeline is specified by the following formula (3), and wherein a value of the following formula (2) and a value of the following formula (3) satisfy the following formula (1):

$$0 < S \leq 6 \times S' \tag{1}$$

$$S = (L+D) \times H/2 = \{L + (L + 2 \times H \times \tan(\theta))\} \times H/2 \tag{2}$$

$$S' = H \times \{H \times \tan(\theta)\}/2 \tag{3}$$

$$0.8 \times d \leq D \leq 3.0 \times d$$

H: height of protrusions (mm)

L: distance between base end parts of two protrusions (mm)

θ: angle (°) formed, in each of protrusions, by a side facing the other protrusion and a vertical line drawn from the front ends of the protrusions down to the ridgeline:

D: distance between centers of front ends of two protrusions (mm)

d: width of weld zone (mm)

(10) The method according to (8) or (9), wherein the area S is 2 times or more the area S'.

(11) The method according to (9), wherein the angle θ is 5° to 80°.

(12) The method according to any one of (8) to (11) wherein the shapes of the two protrusions are isosceles triangular shapes (13) The method according to any one of (1) to (12) wherein a clearance between the punch and die is 0.5 to 30% of the thickness of the workpiece.

Advantageous Effects of Invention

According to the present invention, in a shear processing which shears, by a shear line crossing the weld zone, a workpiece with a large thickness of level difference of a weld zone and/or obtained by welding together a steel sheet with a strength of 1000 MPa or more and another steel sheet (including steel sheet with a strength of 1000 MPa or more), it is possible to form a sheared surface small in residual stress and excellent in surface properties, tensile properties, fatigue resistance, and hydrogen embrittlement resistance and possible to extend the service life of the punch.

BRIEF DESCRIPTION OF DRAWINGS

FIGS. 4A to 4C are views illustrating protrusions with different shapes of front ends. FIG. 4B shows a protrusion with an arc shape of a front end.

FIGS. 5A to 5C are views showing shapes of protrusions in the longitudinal directions.

FIGS. 8A and 8B are views showing the results of measurement of residual stress at a sheared surface. FIG. 8A shows the residual stress in the case where S/S'=2, while

FIGS. 9A to 9C are views showing the results of measurement of the residual stress at a sheared surface. FIG. 9A shows the residual stress in the case where S/S'=6, while

DESCRIPTION OF EMBODIMENTS

Below, the method for shear processing of the present invention (below, sometimes referred to as the "method of the present invention") is explained based on the drawings.

Figure 1:
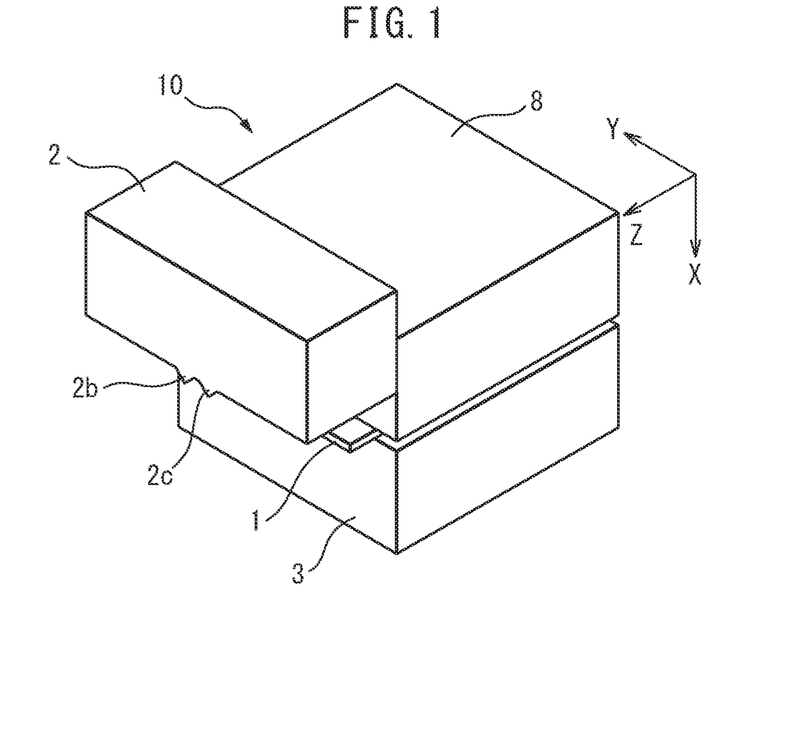
FIG. 1 is a view showing one aspect of a shear processing device using a punch provided with two protrusions at its cutting edge so as to shear a workpiece including a weld zone.
Figure 2:
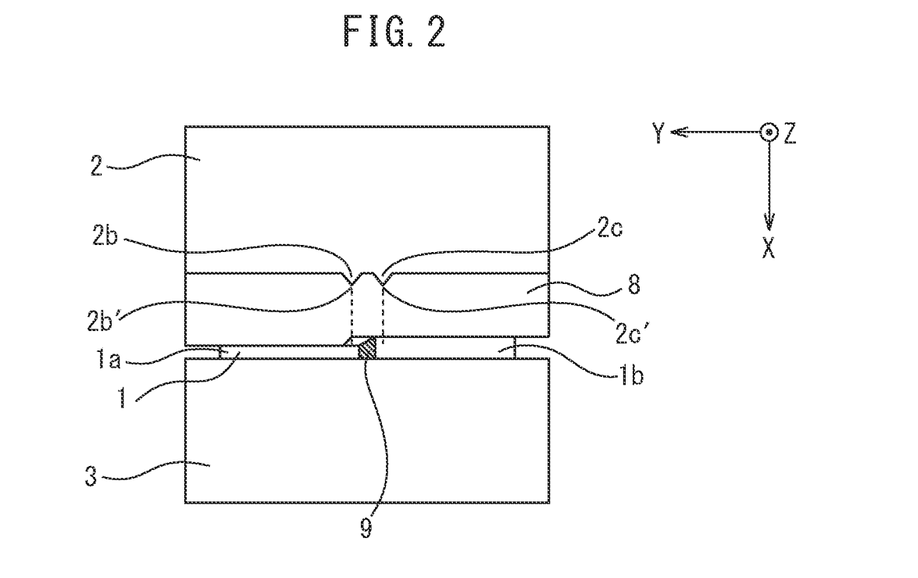
FIG. 2 is a view showing the state of using the shear processing device shown in FIG. 1 to shear a workpiece having a level difference in the weld zone by a shear line crossing the weld zone while sandwich the entire part of the weld zone from the two sides by protrusions.
Figure 3:
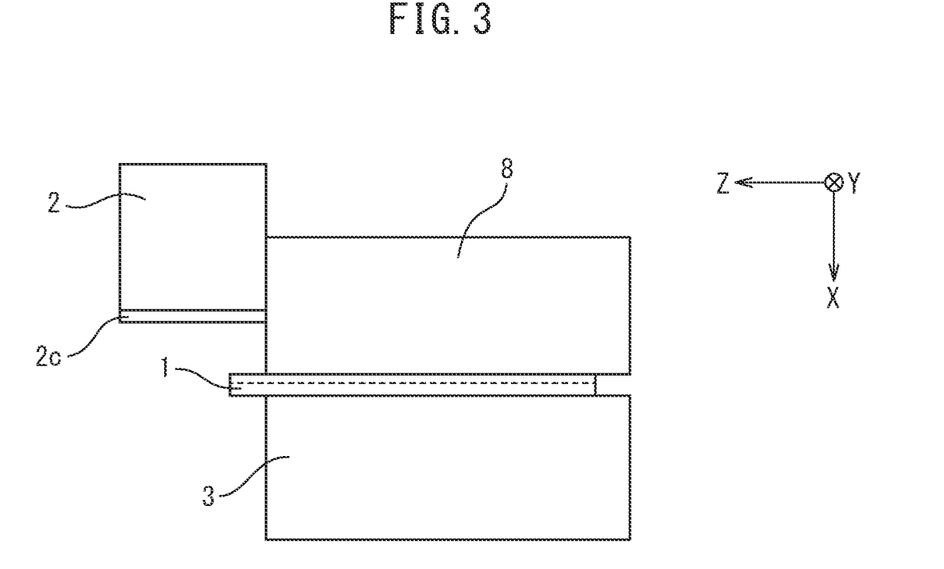
FIG. 3 is a view showing the state of a side surface of the shear processing device shown in FIG. 1.

FIG. 1 is a perspective view of one aspect of a shear processing device using a punch provided with two protrusions at the cutting edge to shear a workpiece including a weld zone. FIG. 2 is a front view of the shear processing device shown in FIG. 1 and shows the state of fastening a workpiece 1 with a level difference at a weld zone by a die 3 and stopper 8 so that all or part of the weld zone 9 of the workpiece 1 is positioned between the two protrusions 2b, 2c of the punch and shearing the workpiece 1 by a shear line crossing the weld zone. FIG. 3 shows the state of the side surface of the shear processing device shown in FIG. 1. In the figure, the X-axis, Y-axis, and Z-axis show three axes perpendicularly crossing each other.

In the method of the present invention, the "protrusions" are protrusions protruding from the cutting edge of the punch in the movement direction of the punch. Preferably the protrusions become smaller in width from the base end parts of the protrusions along the front end directions of the protrusions in the cross-section formed by the ridgeline formed by the blade of the punch and the movement direction of the punch.

In FIG. 1 and FIG. 2, "wedge shaped" protrusions 2b and protrusions 2c with sharp shapes of front ends were shown, but in the method of the present invention, the shapes of the front ends of the protrusions are not limited to specific shapes so long as contributing to improvement of the surface properties of the sheared surface of the weld zone.

Figure 4A:
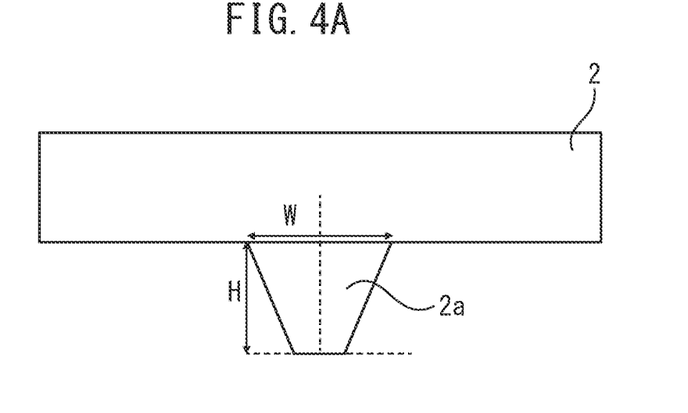
FIG. 4A shows a protrusion with a flat shape of a front end.
Figure 4B:
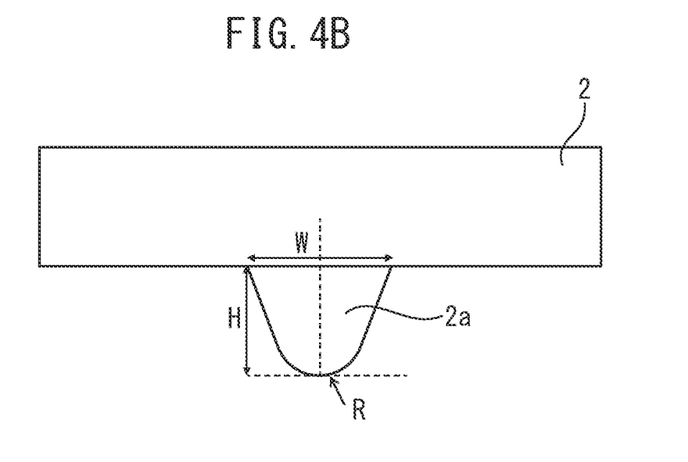
Figure 4C:
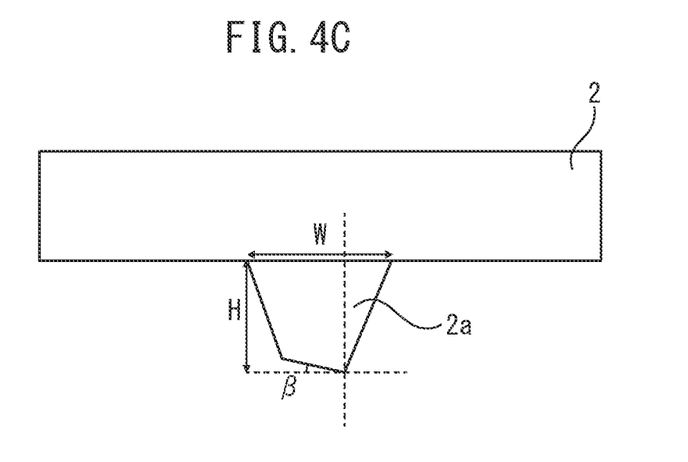
FIG. 4C shows a protrusion with a slanted surface shape of a front end (slant angle β).

FIGS. 4A to 4C illustrate examples of protrusions with different shapes of front ends. FIG. 4A shows a protrusion with a flat shape of a front end at the cross-section formed by the ridgeline formed by the blade of the punch and the movement direction of the punch. FIG. 4B shows a protrusion with an arc shape of a front end at the cross-section formed by the ridgeline formed by the blade of the punch and the movement direction of the punch. FIG. 4C shows a protrusion with a slanted surface shape of a front end (slant angle β) at the cross-section formed by the ridgeline formed by the blade of the punch and the movement direction of the punch. The shapes of the protrusions are suitably selected in accordance with the state of the workpiece and the state of the shearing, but is explained later in detail. Note that in the figures, "W" is the width of the base end parts of the protrusions while "H" is the height of the protrusions.

The two protrusions are formed at the cutting edge of the punch so that all or part of the weld zone of the workpiece is positioned between the two protrusions. That is, the two protrusions are formed on the punch surface at least at the cutting edge so as to sandwich all or part of the weld zone of the workpiece from the two sides of the weld zone (see FIGS. 1 to 3). However, as explained later, the heights (H) of the protrusions do not necessarily have to be made fixed.

Figure 5A:
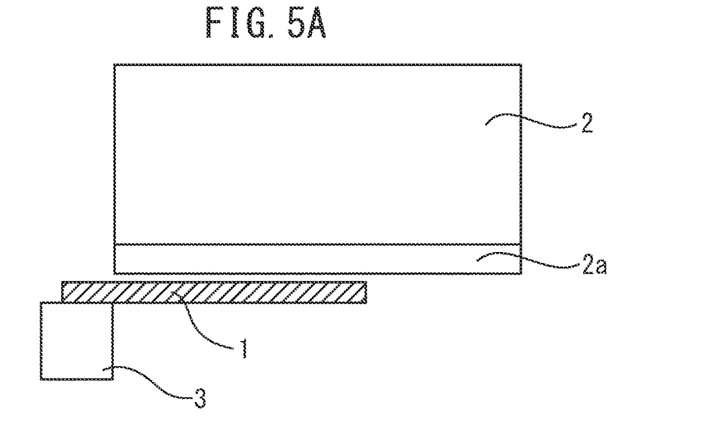
FIG. 5A shows a protrusion with the same height in the longitudinal direction.
Figure 5B:
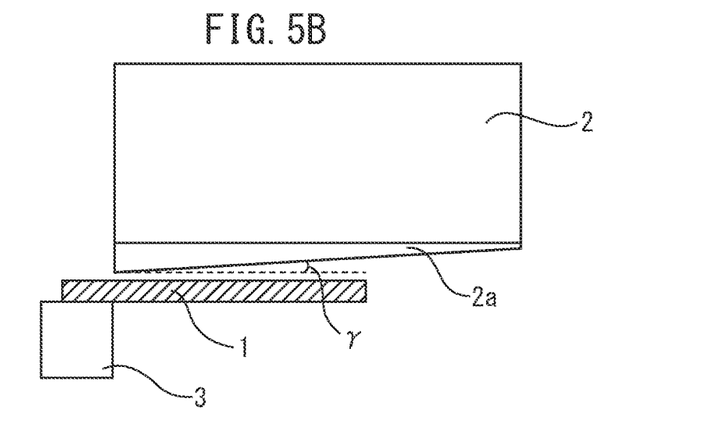
FIG. 5B shows a protrusion with a height gradually decreasing linearly in the longitudinal direction.
Figure 5C:
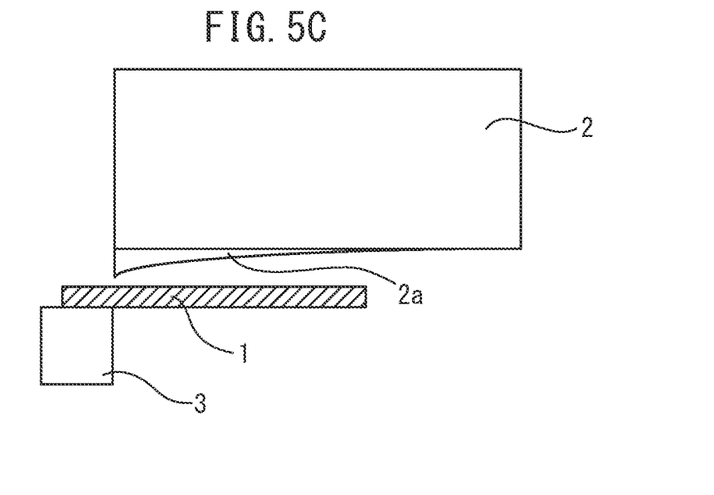
FIG. 5C shows a protrusion with a height gradually decreasing in a curve in the longitudinal direction.

FIGS. 5A to 5C show examples of shapes of protrusions in the longitudinal directions (directions vertical to ridgeline formed by blade of punch and movement direction of punch). The protrusion of FIG. 5A is fixed in height in the longitudinal direction, the protrusion of FIG. 5B gradually decreases in height linearly in the longitudinal direction, and the protrusion of FIG. 5C gradually decreases in height in a curve in the longitudinal direction.

Normally, to prevent breakage of the protrusions, protrusions with fixed heights in the longitudinal direction are formed on the punch surface (see FIG. 5A). However, considering the state of the workpiece and/or the state of the shearing, for example, when hardness of the punch provided with the protrusions can be sufficiently secured compared with the workpiece or when damage to the punch provided with the protrusions does not become to be considerable, as shown in FIG. 5B, it is also possible to form protrusions gradually decreasing in height linearly in the longitudinal direction and, as shown in FIG. 5C, it is also possible to form protrusions gradually decreasing in height curved in the longitudinal direction.

As shown in FIG. 1 and FIG. 2, the shear processing device 10 is provided with a punch 2 having two wedge shaped protrusions of a protrusion 2b and protrusion 2c, a die 3, and a stopper 8. The stopper 8 fastens the workpiece 1 placed on the die 3. The workpiece 1 composed of two types of metal sheets formed into a sheet shape by rolling (for example, steel sheets) and differing in sheet thickness and, as necessary, strength welded together and has a weld zone 9 with a level difference at the center thereof (see FIG. 2).

As shown in FIG. 2, at the time of the shear processing, the two protrusion 2b and protrusion 2c provided at the cutting edge of the punch 2 are respectively made to abut against the metal sheet 1a and metal sheet 1b and sandwich the two sides of the weld zone 9 with a level difference of the workpiece 1 and the workpiece 1 is sheared by a shear line crossing the weld zone. FIG. 2 shows the state of shearing a workpiece with a level difference in the weld zone, but the method of the present invention can naturally shear a workpiece with no level difference in the weld zone (including workpiece obtained by welding together metal sheets of the same sheet thicknesses which differ in strength).

When pushing down the punch 2, as shown by the broken lines of FIG. 2, first, the front end 2c' of the protrusion 2c of the punch 2 abuts against the thick metal sheet 1b of the workpiece 1 placed on the die 3. If further pushing down the punch 2, the front end 2b' of the protrusion 2b of the punch 2 abuts against the thin metal sheet 1a of the workpiece 1.

When pushing furthermore down the punch 2 in the state with the protrusion 2b and protrusion 2c of the punch 2 sandwiching the weld zone 9 of the workpiece 1 at the two sides to push against the workpiece 1, the workpiece 1 is curved with the part including the weld zone sandwiched by the protrusion 2b and protrusion 2c being warped downward. The workpiece 1 is sheared upon receiving the shearing action by the punch 2 and die 3 in a curved state warped downward.

All or part of the weld zone of the workpiece has to be positioned between the protrusion 2b and the protrusion 2c.

However, preferably all of the weld zone is positioned between the protrusion 2b and protrusion 2c, and preferably at least all of the weld metal is positioned between the protrusion 2b and the protrusion 2c.

Figure 6:
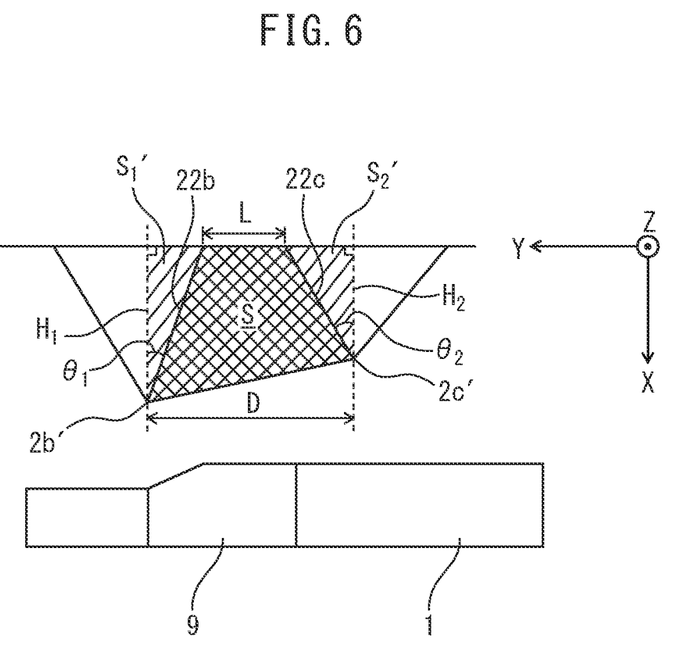
FIG. 6 is a view schematically showing the cross-sectional state of a workpiece obtained by welding together metal sheets with different sheet thicknesses and the cross-sectional state of two protrusions abutting against the two sides of a weld zone of the workpiece and explaining the basic concept of the method for shearing processing of the present invention.

FIG. 6 is a view schematically showing the cross-sectional state of the two protrusions and explaining the basic concept of the method for shear processing of the present invention. At the cross-section formed by the ridgeline formed by the blade of the punch and the movement direction of the punch (X-direction), the area surrounded by the facing sides 22b, 22c of the two protrusions, the ridgeline, and the line connecting the front ends 2b', 2c' of the two protrusions 2b, 2c is defined as S. At the protrusion at the left side of FIG. 6, the area surrounded by the side 22b facing the other protrusion, the ridgeline, and the vertical line $H_1$ drawn from the front end 2b' of the protrusion down to the ridgeline is defined as $S'_1$. Similarly, at the protrusion at the right side of FIG. 6, the area surrounded by the side 22c facing the other protrusion, the ridgeline, and the vertical line $H_2$ drawn from the front end 2c' of the protrusion down to the ridgeline is defined as $S'_2$. The ½ of the total of the areas of the cross-sections of the two protrusions ($S'_1+S'_2$) is defined as S'. At this time, preferably the following formula (1) is satisfied:

$$0 < S \leq 6 \times S' \quad (1)$$

If the area S between the protrusions is over 0, a binding effect is exhibited. On the other hand, even if the area S between the protrusions is over 6×S', the binding effect is not sufficiently exhibited, so the area S between the protrusions is preferably 6×S' or less.

FIG. 1, FIG. 2, and FIG. 6 are examples where the base end parts of the two protrusions do not overlap, but the two protrusions may also overlap at the cross-section. In this case, it is sufficient to make the height from the crossing point of the tapered surfaces to the front ends of the protrusions the height of the protrusions.

To make the binding effect be sufficiently exhibited, the area S between the protrusions is preferably 2×S' or more. That is, preferably the following formula (1)' is satisfied:

$$2 \times S' \leq S \leq 6 \times S' \quad (1)'$$

More preferably it is 3×S' or more.

Further, regarding the upper limit, to make the binding effect be reliably exhibited, more preferably it is made 5×S' or less.

Figure 7:
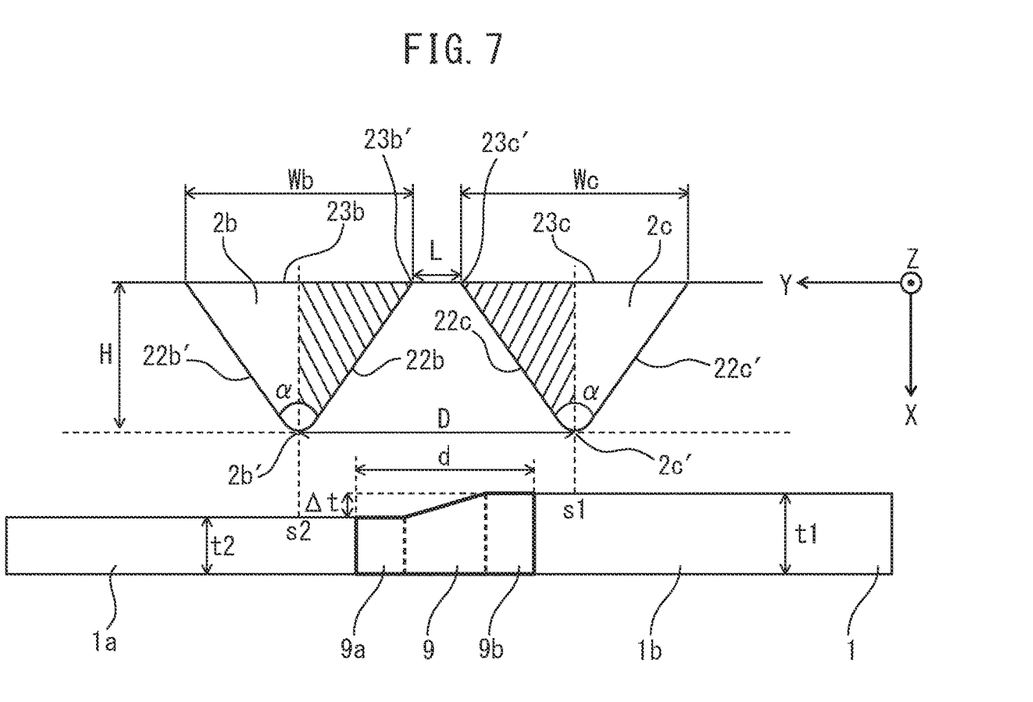
FIG. 7 is a view for explaining the basis concept of the method for shear processing of the present invention in the case where at the cross-section formed by a ridgeline formed by a blade of a punch and a movement direction of the punch, the shapes of the two protrusions are the same isosceles triangular shapes.

FIG. 7 schematically shows the cross-sectional state of a workpiece obtained by welding together metal sheets differing in sheet thickness and the cross-sectional state of the two protrusions abutting against the two sides of the weld zone of the workpiece. The basic concept of the method for shear processing of the present invention is explained using FIG. 7, which illustrate the case where in the cross-section formed by the ridgeline formed by the blade of the punch and the movement direction of the punch, the shapes of the two protrusions are the same isosceles triangular shapes. The X-axis, Y-axis, and Z-axis show three axes perpendicularly crossing each other.

The protrusion 2b and the protrusion 2c provided at the cutting edge of the punch are preferably ones of the same shapes from the viewpoint of securing a uniform shearing force in the shear line direction of the workpiece 1. FIG. 2 shows the same "wedge shaped" protrusions. Further, the shapes of the protrusions are preferably shapes symmetric left and right from the viewpoint of suppressing damage to the front ends of the protrusions (see FIGS. 4A and 4B), but may also be wedge shapes asymmetric left and right so long as being able to secure a sheared surface excellent in surface properties (see FIG. 4C).

If the thickness of the level difference of the weld zone of the workpiece (difference of sheet thicknesses of metal sheets) is large, to secure a uniform shearing force in the width direction of the workpiece (shear line direction), the cutting edge of the punch may be provided with protrusions of different shapes (for example, protrusion shown in FIG. 4A and protrusion shown in FIG. 4B). Further, it may be provided with protrusions of shapes symmetric left and right (for example, protrusions shown in FIG. 4A or protrusions shown in FIG. 4B) and protrusions of shapes asymmetric left and right (for example, protrusions shown in FIG. 4C).

The protrusion 2b (2c), as shown in FIG. 7, preferably becomes smaller in width from the base end part 23b (23c) contiguous to the cutting edge of the punch toward the front end 2b' (2c') of the protrusion at the cross-section formed by the ridgeline formed by the blade of the punch and the movement direction of the punch.

Reference notation 22b and 22b' of FIG. 7 show contours of the tapered surface forming the protrusion at the left side of FIG. 7. Therefore, below, for simplification, the "tapered surface 22b" etc. is referred to. Further, similarly, reference notations 22c, 22c' show the contours of the tapered surface of the protrusion at the right side of FIG. 7, so below, for simplification, the "tapered surface 22c" etc. is referred to.

The angle α formed by the tapered surface 22b and the tapered surface 22b' (tapered surface 22c and tapered surface 22c') is preferably 10° to 160°. When a is less than 10°, the protrusion becomes thin and becomes easily damaged. Therefore, a is preferably 10° or more. More preferably it is 30° or more. On the other hand, if a exceeds 160°, the effect of the compressive force of the protrusions acting on the weld zone and cancelling the residual stress (below, referred to as the "binding effect") falls, so a is preferably 160° or less. More preferably, it is 140° or less.

In FIG. 7, the heights of the protrusion 2b and the protrusion 2c are H. The width Wb of the base end part of the protrusion 2b and the width We of the base end part of the protrusion 2c are the same. The protrusion 2b and the protrusion 2c are provided at the punch with a distance between the front end 2b' of the protrusion 2b and the front end 2c' of the protrusion 2c of D and with a distance between the base end part 23b of the protrusion 2b and the base end part 23c of the protrusion 2c of L.

The front end 2b' (2c') of the protrusion 2b (2c) is formed to an arc shape in the Z-axial direction (see FIG. 4B), but the front end 2b' (2c') may also be formed into a flat shape (see FIG. 4A). By forming the front end 2b' (2c') into an arc shape or flat shape, it is possible to prevent damage to the punch. That is, if the angle α formed by the tapered surface of the protrusion is an acute angle, the protrusion is liable to be damaged, but by making the shape of the front end an arc shape or flat shape, the protrusion and, further, the punch can be protected.

The workpiece 1 is a workpiece obtained by welding together a metal sheet 1b with a thick sheet thickness t1 and a metal sheet 1a with a thin sheet thickness t2. The workpiece 1 has a weld zone 9 which includes a heat affected zone 9a of the metal sheet 1a and a heat affected zone 9b of the metal sheet 1b and which has a width "d" and a thickness of the level difference Δt (=t1−t2). Note that, the method of the present invention also includes shearing a workpiece with a Δt=0.

When pushing down the punch having the protrusion 2b and protrusion 2c, the front end 2c' of the protrusion 2c abuts against the abutting point s1 at the metal sheet 1b at the outside of the heat affected zone 9b of the weld zone 9. When pushing down the punch furthermore, the front end 2b' of the protrusion 2b abuts against the abutting point s2 at the metal sheet 1a at the outside of the heat affected zone 9a of the weld zone 9.

After the protrusion 2b and the protrusion 2c abut against the workpiece 1, the protrusion 2b and the protrusion 2c sandwich the weld zone 9 at the two sides, and fix the position of the weld zone at the time of the shear processing. The weld zone 9 is pressed by the tapered surface 22b of the protrusion 2b and the tapered surface 22c of the protrusion 2c from the two sides while the workpiece 1 is sheared.

Due to the shear processing, it is possible to form a sheared surface with a small residual stress and excellent surface properties at the entire width of the workpiece including the weld zone. Further, in the shear processing, the front ends of the protrusions of the punch do not abut against the heat affected zones of the hardened weld zone, so compared to when the protrusions abut against the weld zone, it is possible to keep wear of the protrusions from advancing and possible to extend the service life of the punch.

FIG. 7 shows the state of shearing a workpiece while sandwiching the entire part of the weld zone by the two protrusions from the two sides of the weld zone. However, it is also possible to shear the workpiece while sandwiching part of the weld zone from both sides of the part thereof by virtue of the two protrusions. In this case, the shapes of the front ends of the protrusions abutting against the heat affected zones of the hardened weld zone are preferably shapes enabling the required shearing force to be secured and resistant to advance of wear of the protrusions (for example, see FIG. 4C).

The reason why, when shearing a workpiece having a weld zone by virtue of shearing the workpiece in the state where the two protrusions provided at the punch sandwich all or part of the weld zone, it is possible to form a sheared surface small in residual stress and excellent in surface properties at the entire width of the workpiece including the weld zone (shear line crossing weld zone). The reason why the sheared surface small in residual stress and excellent in surface properties is obtained is believed to be as follows:

The protrusions abut against the two sides of all or part of the weld zone, the weld zone is fastened between the abutting protrusions, the position of the weld zone does not shift on the die (that is, the workpiece does not shift on the die), and the tapered surfaces of the protrusions cause a compressive stress to act on the weld zone. In that state, shearing progresses.

At the weld zone including the heat affected zone, due to the heat input at the time of welding, the crystal grains coarsen and the ductility and/or toughness falls, so usually, when tensile stress remains at the sheared surface, cracks are liable to easily form at the sheared surface. By virtue of reducing the tensile stress remaining at the sheared surface of the weld zone, it is possible to suppress formation of cracks at the sheared surface and/or hydrogen embrittlement cracks.

When shearing the weld zone in the state where a compressive stress acts on the weld zone due to the tapered surfaces of the protrusions, after shearing, the tensile stress remaining at the sheared surface is eased and a sheared surface with a small residual stress can be formed. Therefore, in the method of the present invention, it is possible to remarkably suppress formation of cracks at the sheared surface of the weld zone and/or hydrogen embrittlement cracks.

The inventors fixed the height H of the protrusions and changed the distance D between the cutting edges of the protrusions, the distance L between the base end parts of the protrusions, and/or the tapered surface angle α and changed the thickness of the level difference Δt of the weld zone of the workpiece to shear workpieces, investigated the states of formation of cracks at the sheared surfaces of the weld zones, and confirmed the binding effect of the two protrusions on the weld zone.

As a result, the binding effect of the two protrusions on the weld zone depends on the distance D between the front ends of the protrusions or the distance L between the base end parts of the protrusions. The inventors found that when the cross-sectional area S of a space formed by the tapered surfaces of two protrusions and covering all or part of the weld zone (sometimes referred to as the "protrusion space") satisfies the following formula (1) in relation to ½ of the cross-sectional area 2S' of protrusions (=S'), the binding effect of the two protrusions on the weld zone is remarkably expressed without regard to Δt.

$$2 \times S' \leq S \leq 6 \times S' \quad (1)$$

$$S=(L+D) \times H/2=\{L+(L+2 \times H \times \tan(\alpha/2))\} \cdot H/2$$

$$S'=H \times \{H \times \tan(\alpha/2)\}/2$$

$$0.8 \times d \leq D \leq 3.0 \times d$$

H: height of protrusions (mm)

L: distance between base end parts of two protrusions (mm)

α: angle formed by facing tapered surfaces of protrusions (°)

D: distance between centers of front ends of two protrusions (mm)

"d": width of weld zone (mm)

Furthermore, when the shapes of the two protrusions are symmetric left and right, it is possible to obtain effects similar to when the shapes of the two protrusions are isosceles triangular shapes. When the shapes of the two protrusions are symmetric left and right, at FIG. 6, it can be expressed that $\theta_1=\theta_2=\theta$, $H_1=H_2=H$.

That is, at the cross-section formed by a ridgeline formed by a blade of a punch and a movement direction of the punch, in case that the shapes of the two protrusions are symmetric with respect to an axis parallel to the movement direction of the punch, when the area S surrounded by the facing sides of the two protrusions, the ridgeline, and the line connecting the front ends of the two protrusions is specified by the following formula (2), the area S' surrounded by the side facing the other protrusion at each protrusion, the ridgeline, and vertical line drawn from the front end of the protrusion down to the ridgeline is specified by the following formula (3), and the value of the following formula (2) and the value of the following formula (3) satisfy the following formula (1), the binding effect of the two protrusions on the weld zone is remarkably expressed:

$$0<S \leq 6 \times S' \quad (1)$$

$$S=(L+D) \times H/2=\{L+(L+2 \times H \times \tan(\theta))\} \times H/2 \quad (2)$$

$$S'=H \times \{H \times \tan(\theta)\}/2 \quad (3)$$

$$0.8 \times d \leq D \leq 3.0 \times d$$

H: height of protrusions (mm)

L: distance between base end parts of two protrusions (mm)

θ: angle (°) formed, in each of protrusions, by a side facing the other protrusion and a vertical line drawn the front end of the protrusion to the ridgeline D: distance between centers of front ends of two protrusions (mm)

d: width of weld zone (mm)

For the same reason as the case where the shapes of the two protrusions are isosceles triangular shapes, the angle θ is preferably 5° to 80°. More preferably, it is 15° to 70°. Further, preferably the area S is 2 times or more of the area S' and satisfies the following formula (1)':

$$2 \times S' \leq S \leq 6 \times S' \quad (1)'$$

As shown in FIG. 6, in case that the shapes of the two protrusions are asymmetric, when the area surrounded by the facing sides 22b, 22c of the two protrusions, the ridgeline L, and the line D connecting the front ends 2b', 2c' of the two protrusions 2b, 2c is specified by the following formula (4), the total of the areas $S'_1$ and $S'_2$ surrounded by the sides 22b, 22c facing the other protrusion in each of protrusions, the ridgeline L, and the vertical lines $H_1$, $H_2$ drawn from the front ends 2b', 2c' of the protrusions down to the ridgeline L is specified by the following formula (5), the value of the following formula (4) and the value of the following formula (5) satisfy the following formula (1), and the relationship between the width "d" of the weld zone and the distance D between the centers of the front ends of the two protrusions satisfies the following formula (6), the effect of the two protrusions constraining the weld zone is remarkably expressed:

$$0<S \leq 6 \times S' \quad (1)$$

$$S=D \times (H_1+H_2) \times 1/2-(S'_1+S'_2)=(H_1 \cos \theta_1+L+H_2 \cos \theta_2) \times (H_1+H_2) \times 1/2-[H_1 \times \{H_1 \times \tan(\theta_1)\} \times 1/2+H_2 \times \{H_2 \times \tan(\theta_2)\} \times 1/2] \quad (4)$$

$$S'=1/2 \times (S'_1+S'_2)=1/2 \times [H_1 \times \{H_1 \times \tan(\theta_1)\} \times 1/2+H_2 \times \{H_2 \times \tan(\theta_2)\} \times 1/2] \quad (5)$$

$$0.8 \times d \leq D \leq 3.0 \times d \quad (6)$$

$H_1$, $H_2$: heights of respective protrusions (mm)

L: distance between base end parts of two protrusions (mm)

$\theta_1$, $\theta_2$: angles)(° formed, in each of protrusions, by a side facing the other protrusion and a vertical line drawn from front end of the protrusion down to the ridgeline "d": width of weld zone (mm)

D: distance between centers of front ends of two protrusions (mm), expressed by following formula:

$$D=H_1 \cos \theta_1+L+H_2 \cos \theta_2 \quad (7)$$

For the same reason as the case where the shapes of the two protrusions are isosceles triangular shapes, the angles $\theta_1$, $\theta_2$ are preferably respectively 5° to 80°. More preferably, they are 15° to 70°. Further, preferably the area S is 2 times or more of the area S' and satisfies the following formula (1)':

$$2 \times S' \leq S \leq 6 \times S' \quad (1)'$$

At the time of the shear processing, all or part of the weld zone of the width "d" is fastened between the two protrusions, and therefore, the distance D between the centers of the front ends of the two protrusions is preferably 0.8×d or more. More preferably it is 1.0×d or more. On the other hand, if the abutting positions of the front ends of the protrusions (in FIG. 5, s1 and s2) are too far from the weld zone, the above binding effect is difficult to realize, so the distance D between the centers of the front ends of the two protrusions is preferably 3.0×d or less. More preferably, it is 2.8×d or less.

Note that, when the shapes of the protrusions are asymmetric left and right, the centers of the front ends of the protrusions are defined as the positions where the center lines of the protrusions pass. For example, in the case of the asymmetric left-right protrusions with front end shapes of slanted surface shapes with slant angles β shown in FIG. 4C, the centers of the front ends of the protrusions are the positions where the center lines of the protrusions pass.

Under conditions where the distance D between the front ends of the two protrusions is 0.8×d (d: width of weld zone) to 3.0×d, a "cross-sectional area S of a protrusion space formed by the tapered surfaces of two protrusions and covering the weld zone" satisfying the above formula (1) (below, sometimes referred to as the "protrusion space cross-sectional area S") is secured.

In the method of the present invention, at the time of the shear processing, the two protrusions provided at the cutting edge of the punch sandwich and fasten all or part of the weld zone of the workpiece from the two sides. Therefore, even if the thickness of the level difference Δt of the weld zone becomes large, the position of the weld zone is fixed, the workpiece is not caused to shift on the die, and shear processing is carried out. For this reason, compared with the conventional shear processing where no protrusions are provided at the cutting edge of the punch, the interval between the punch and die (below, sometimes referred to as the "clearance") can be made relatively large.

According to results of tests by the inventors, when shearing a workpiece obtained by welding together a thickness t1 metal sheet and thickness t2 (<t1) metal sheet and having a thickness of a level difference Δt of the weld zone (=t1−t2), the clearance is preferably 0.5 to 30% of "t"=(t1+t2)/2. Even if Δt=0, the clearance is preferably 0.5 to 30% of the sheet thickness t1 (t2).

When the clearance is less than 0.5% of the thickness "t" of the workpiece (=(t1+t2)/2, including the case of t1=t2 as well), chipping may occur at the cutting edge of the punch and/or the front ends of the protrusions, so the clearance is preferably 0.5% or more of the thickness "t" of the workpiece. More preferably it is at least 1.0%.

On the other hand, when the clearance exceeds 30% of the thickness "t" of the workpiece, at the time of the shear processing, the workpiece is liable to be curved more and large burrs are liable to form, so the clearance is preferably not more than 30% of the thickness "t" of the workpiece. More preferably, it is not more than 25%.

In the method for shear processing of the present invention, it is necessary to provide two protrusions at the cutting edge of the punch so that all or part of the weld zone of the workpiece falls between the two protrusions, but other protrusions besides the two protrusions may also be formed. However, from the viewpoints of streamlining maintenance of the shear processing device and keeping the force applied to the two protrusions from decreasing, the cutting edge of the punch preferably is not provided with protrusions other than the two protrusions.

In the method of the present invention, the workpiece to be sheared is for example a workpiece obtained by welding together metal sheets comprising copper, zinc, tin, aluminum, titanium, magnesium, and alloys based on the same. The material of the workpiece need only be a material able to be sheared and is not limited to any specific material.

Further, the thickness of the workpiece need only be a thickness able to be sheared and is not limited to any specific thickness.

In cold shearing, from the viewpoint of maintaining the shape and dimensional precisions of the sheared workpiece, the thickness of the workpiece is preferably 6.0 mm or less. In particular, when high shape and dimensional precisions of the sheared workpiece are demanded, the thickness of the workpiece is more preferably 3.0 mm or less. When shearing a workpiece with a level difference in the weld zone obtained by welding together metal sheets with different sheet thicknesses, the thickness of the thicker metal sheet, as explained above, is preferably 6.0 mm or less, more preferably 3.0 mm or less.

On the other hand, if a thin metal sheet becomes extremely thin, sometimes the strength of the weld zone cannot be sufficiently secured, so the sheet thickness of a thin metal sheet is preferably 0.1 mm or more. More preferably it is 0.5 mm or more.

However, when shearing a workpiece having a weld zone by a shear line crossing the weld zone, so long as the process for shearing the weld zone is smoothly carried out and a sheared surface excellent in surface properties is obtained, the thickness of the workpiece and the width of the level difference of the weld zone are not limited to any specific ranges.

EXAMPLES

Next, examples of the present invention is explained, but the conditions in the examples are just illustrations of conditions employed for confirming the workability and advantageous effects of the present invention. The present invention is not limited to these illustrations of conditions. The present invention can employ various conditions so long as not departing from the gist of the present invention and achieving the object of the present invention.

Examples

Sheet thickness 1.4 mm 780 MPa class steel sheets and sheet thickness 1.6 mm 1180 MPa class steel sheets were welded together to manufacture workpieces (thickness of level difference Δt=0.2 mm, below referred to as "78-118 workpieces"). The 78-118 workpieces were sheared by the shear processing device shown in FIGS. 1 to 3 (two protrusions at cutting edge of punch).

The shapes of the protrusions were heights H=1 mm, widths Wb (Wc) of base end parts (Wc)=2 mm, and angles α=90°. The widths "d" of the weld zones were 2 mm, so the distances D between the front ends of the protrusions were 2 to 5 mm and the distances L between the base end parts of the protrusions were 0 to 3 mm.

Table 1 shows the shearing conditions. The cross-sectional area of the space formed by the tapered surfaces of the two protrusions and covering the weld zone (spatial cross-sectional area) S is 1 to 4 mm$^2$ and 2S' of the cross-sectional areas of the protrusions is 1 mm$^2$, so S and S' satisfy the above formula (1) except for the conditions of No. 4 in Table 1. The clearance was made 10% of the thickness "t" (=(t1+t2)/2) of the workpiece.

TABLE 1

| No. | Sheet thickness t1 (mm) | Sheet thickness t2 (mm) | Width "d" of weld zone (mm) | Distance L between base end parts of protrusions (mm) | Distance D between centers of front ends of protrusions (mm) | Spatial cross-sectional area S of protrusions (mm²) | Cross-sectional area 2S' of protrusions (mm²) | S/S' | Clearance (%) |
|---|---|---|---|---|---|---|---|---|---|
| 1 | 1.4 | 1.6 | 2 | 0 | 2 | 1 | 1 | 2 | 10 |
| 2 | 1.4 | 1.6 | 2 | 1 | 3 | 2 | 1 | 4 | 10 |
| 3 | 1.4 | 1.6 | 2 | 2 | 4 | 3 | 1 | 6 | 10 |
| 4 | 1.4 | 1.6 | 2 | 3 | 5 | 4 | 1 | 8 | 10 |

The shearing was performed using a servo press at a punching speed of 100 mm/sec. The residual stress was measured at the sheared surface including the weld zone. Further, the sheared surface including the weld zone was immersed in a 1 to 100 g/liter concentration ammonium thiocyanate solution for 72 hours to investigate the hydrogen embrittlement resistance.

Figure 8A:
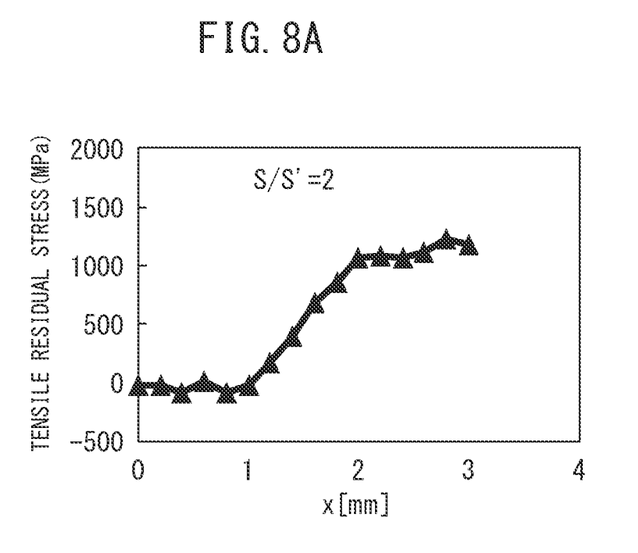

FIG. 8A to FIG. 10 show the results of measurement of the residual stress at the sheared surface. FIG. 8A shows the residual stress in the case of S/S'=2 of No. 1 in Table 1, FIG. 8B shows the residual stress in the case of S/S'=4 of No. 2 in Table 1, FIG. 9A shows the residual stress in the case of S/S'=6 of No. 3 in Table 1, and FIG. 9B shows the residual stress in the case of S/S'=8 of No. 4 in Table 1.

Figure 9A:
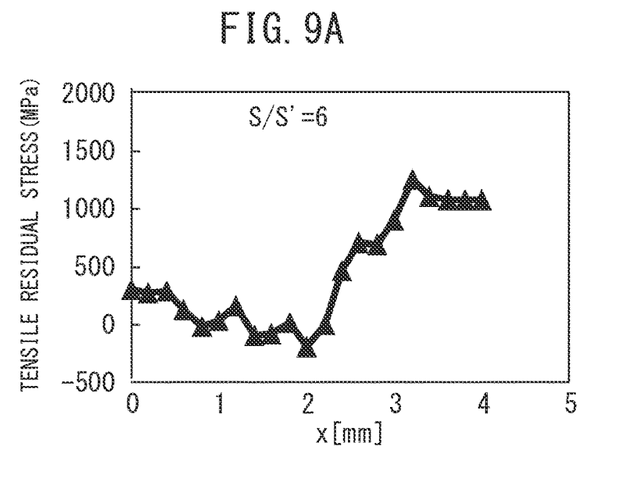
Figure 9B:
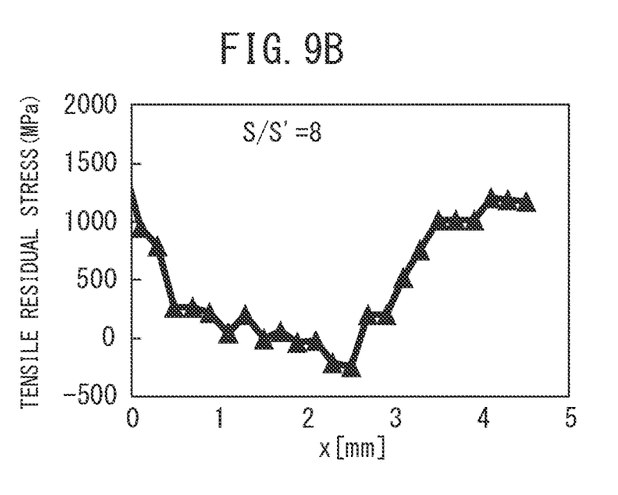
FIG. 9B shows the residual stress in the case where S/S'=8.
Figure 9C:
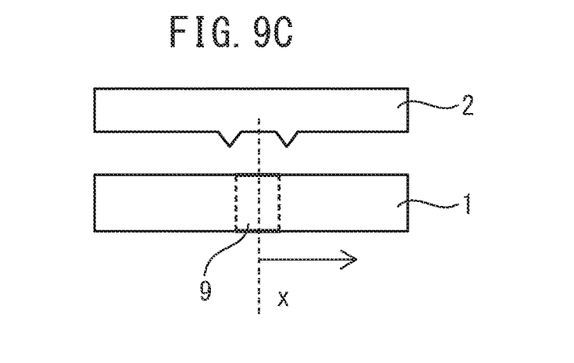
FIG. 9C shows that the abscissas of FIGS. 8A and 8B and FIGS. 9A and 9B are the distances "x" (mm) from the center positions when defining the center position of the weld zone as 0.

Each abscissa, as shown in FIG. 9C, shows the distance x (mm) from the center position of the weld zone when defining the center position as 0. The residual stress is the residual stress measured at the center part of the sheet thickness. The residual stress was found at the sheared surface by measurement of the change in interstitial distance by X-ray diffraction.

Figure 8B:
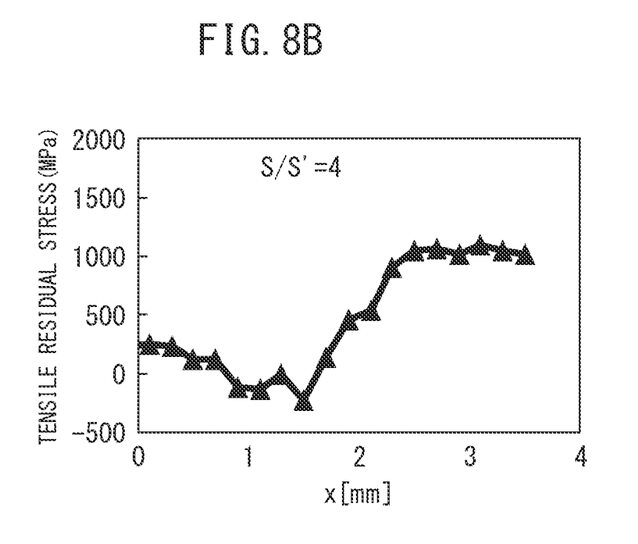
FIG. 8B shows the residual stress in the case where S/S'=4.

From FIG. 8A, FIG. 8B, and FIG. 9A, it is learned that if S/S' satisfies the above formula (1), the residual stress at the sheared surface of the weld zone is small. FIG. 9B shows the residual stress in the case of S/S'=8 off from the above formula (1). It is learned that the residual stress at the center part of the weld zone is large, but the residual stress is small at the sheared surface other than the center part. This is believed because the effect of the protrusions in fixing the weld zone failed to reach the center part.

Figure 10:
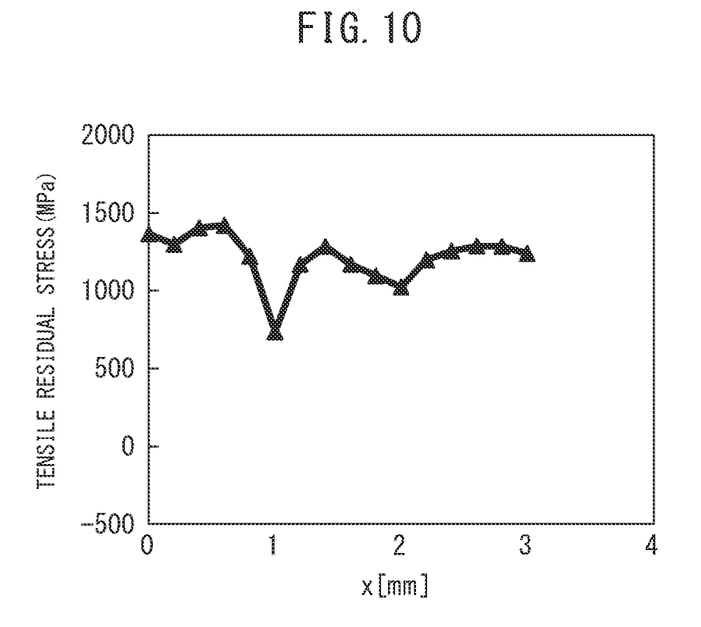
FIG. 10 shows the results of measurement of the residual stress at a sheared surface using a shear processing device not provided with two protrusions at the cutting edge of the punch.

FIG. 10 shows the results of measurement of the residual stress at a surface sheared using a shear processing device in which two protrusions are not provided at the cutting edge of a punch. There is a location in the weld zone where a 1000 MPa or more high tensile residual stress occurs.

Table 2 shows the results of an ammonium thiocyanate solution immersion test of a sheared surface.

TABLE 2

| Concentration of thiocyanic acid | No protrusions | S/S' | | | |
|---|---|---|---|---|---|
| | | 2 | 4 | 6 | 8 |
| 1 g/liter | Good | Good | Good | Good | Good |
| 10 g/liter | Poor | Good | Good | Good | Poor |
| 50 g/liter | Poor | Good | Good | Good | Poor |
| 100 g/liter | Poor | Good | Good | Poor | Poor |

Good: No cracks,
Poor: Cracks

At a sheared surface formed by shearing by a punch not provided with protrusions, cracks occurred at the weld zone after immersion in a 10 g/liter or more concentration ammonium thiocyanate solution for 72 hours.

On the other hand, it is learned that at a sheared surface formed by shearing by a punch provided with two protrusions, hydrogen embrittlement cracks are suppressed. In the case of S>6S', the effect of suppression of hydrogen embrittlement cracks could not be confirmed at a concentration of 10 g/liter or more.

INDUSTRIAL APPLICABILITY

As explained above, according to the present invention, in a shear processing which shears, by a shear line crossing the weld zone, a workpiece with a large thickness of step difference of a weld zone and/or obtained by welding together a steel sheet with a strength of 1000 MPa or more and another steel sheet (including steel sheet with a strength of 1000 MPa or more), it is possible to form a sheared surface small in residual stress and excellent in surface properties, tensile properties, fatigue resistance, and hydrogen embrittlement resistance and possible to extend the service life of the punch. Accordingly, the present invention has high industrial applicability in industries working steel sheet.

REFERENCE SIGNS LIST 1. workpiece 1a. thin metal sheet 1b. thick metal sheet
2. punch 2a, 2b, 2c. protrusions 2b', 2c'. front ends of protrusions
3. die
8. stopper
9. weld zone
9a, 9b. heat affected zones
10. shear processing device
22b, 22b'. tapered surfaces of protrusions
22c, 22c'. tapered surfaces of protrusions
23b, 23c. base end parts of protrusions
t1, t2. thicknesses of metal sheet
"d". width of weld zone
Δt. thickness of level difference of weld zone
s1, s2. abutting points of protrusions with cutting edge
L. distance between base end parts of protrusions
D. distance between centers of front ends of two protrusions
H. height of protrusion
W, Wb, Wc. widths of base end parts of protrusions
α. angle formed by pair of tapered surfaces of protrusion

The invention claimed is:

1. A method for shear processing to shear a workpiece so as to cross a weld zone of the workpiece by using a shear processing device comprising a die, a stopper, and a punch, the workpiece obtained by welding two metal sheets, wherein the punch has two protrusions at a cutting edge of the punch, all or a part of the weld zone of the workpiece are positioned between the two protrusions of the punch, and the workpiece is sheared in a state where the protrusions abut and fix the workpiece such that the workpiece is curved with a part including the weld zone sandwiched by the two protrusions being warped toward the die.

2. The method according to claim 1,
wherein, in a cross-section of the two protrusions, the cross-section being formed by a ridgeline of a blade of the punch and a movement direction of the punch, facing sides in the two protrusions are gradually away in a direction extending from a base end part of the punch toward the front ends of the protrusions.

3. The method according to claim 1,
wherein, in a cross-section of the two protrusions, the cross-section being formed by a ridgeline of a blade of the punch and a movement direction of the punch, shapes of the front ends of the two protrusions are a flat shape, an arc shape, or a slanted surface shape.

4. The method according to claim 1,
wherein, in a cross-section of the two protrusions, the cross-section being formed by a ridgeline of a blade of the punch and a movement direction of the punch, shapes of the front ends of the two protrusions are different from each other, and
the both shapes are a flat shape, an arc shape, or a slanted surface shape.

5. The method according to claim 1, wherein each of the two protrusions has the same height in a direction parallel to the weld zone of the workpiece.

6. The method according to claim 1, wherein each of the two protrusions has a height gradually decreasing in a direction parallel to the weld zone of the workpiece.

7. The method according to claim 1,
wherein a distance D, in terms of mm, between the front ends of the two protrusions is 0.8×d or more and 3.0×d or less, wherein d, in terms of mm, represents a width of the weld zone.

8. The method according to claim 1, wherein in a cross-section formed by a ridgeline of a blade of the punch and a movement direction of the punch, an area S and an area S' satisfy the following formula (1):

$$0 < S \le 6 \cdot S' \quad (1)$$

wherein the area S is an area surrounded by facing sides in the two protrusions, the ridgeline, and a line connecting the front ends of the two protrusions, and wherein an area S' is an ½ area of a total of the respective areas surrounded by, in each of the protrusions, a side facing the other protrusion, the ridgeline, and a vertical line drawn from the front end of the protrusion to the ridgeline.

9. The method according to claim 8, wherein
shapes of the two protrusions are symmetric with respect to an axis parallel to the movement direction of the punch, wherein
an area S surrounded by the facing sides in the two protrusions, the ridgeline, and the line connecting the front ends of the two protrusions is specified by the following formula (2), wherein
an area S' surrounded by, in each of the protrusions, the side facing the other protrusion, the ridgeline, and the vertical line drawn from the front end of the protrusion to the ridgeline is specified by the following formula (3), and wherein
a value of the following formula (2) and a value of the following formula (3) satisfy the following formula (1):

$$0 < S \le 6 \times S' \quad (1)$$

$$S = (L+D) \times H/2 = \{L + (L + 2 \times H \times \tan(\theta))\} \times H/2 \quad (2)$$

$$S' = H \times \{H \times \tan(\theta)\}/2 \quad (3)$$

$$0.8 \times d \le D \le 3.0 \times d$$

H: height of protrusions (mm)
L: distance between base end parts of two protrusions (mm)
θ: angle (°) formed, in each of protrusions, by a side facing the other protrusion and a vertical line drawn from the front end of the protrusion to the ridgeline:
D: distance between centers of front ends of two protrusions (mm)
d: width of weld zone (mm).

10. The method according to claim 9, wherein the angle θ is 5° to 80°.

11. The method according to claim 8, wherein the area S is 2 times or more said area S'.

12. The method according to claim 8 wherein shapes of the two protrusions are isosceles triangular shapes.

13. The method according to claim 1 wherein a clearance between the punch and the die is 0.5 to 30% of a thickness of the workpiece.

* * * * *